PHASE LOCKED LOOP DOUBLE CARRIER TRANSMISSION SYSTEM

Filed Dec. 27, 1967 2 Sheets-Sheet 1

INVENTORS C. F. KURTH
F. J. WITT
BY R. B. Ardis
ATTORNEY

Dec. 22, 1970 C. F. KURTH ET AL 3,550,134

PHASE LOCKED LOOP DOUBLE CARRIER TRANSMISSION SYSTEM

Filed Dec. 27, 1967 2 Sheets-Sheet 2

United States Patent Office 3,550,134 Patented Dec. 22, 1970

3,550,134

PHASE LOCKED LOOP DOUBLE CARRIER TRANSMISSION SYSTEM

Carl F. Kurth and Francis J. Witt, Andover, Mass., assignors to Bell Telephone Laboratories, Incorporated, Murray Hill and Berkeley Heights, N.J., a corporation of New York

Filed Dec. 27, 1967, Ser. No. 694,012
Int. Cl. H04b *1/52*
U.S. Cl. 343—179 2 Claims

ABSTRACT OF THE DISCLOSURE

A double carrier bilateral transmission system is disclosed which comprises a transceiver at each end connected by a lossy transmission medium which introduces significant phase shift and attenuation to a modulated carrier passing therethrough. Each transceiver comprises a phase locked loop which transmits and receives modulated carriers having different carrier frequencies where the different frequencies are integral multiples of each other. One transceiver includes an auxiliary control circuit and an automatic gain control circuit to compensate for the phase shift and attenuation suffered by the modulated carrier in the transmission medium, respectively.

CROSS REFERENCES TO RELATED APPLICATIONS

The following are related applications: W. B. Gaunt, Jr., Ser. No. 678,398, filed Oct. 26, 1967; C. F. Kurth, Ser. No. 693,904, filed Dec. 27, 1967; C. F. Kurth, Ser. No. 693,905, filed Dec. 27, 1967; C. F. Kurth-R. C. MacLean, Ser. 693,967, filed Dec. 27, 1967; C. F. Kurth, Ser. No. 693,906, filed Dec. 27, 1967; C. F. Kurth, Ser. No. 693,922, filed Dec. 27, 1967.

BACKGROUND OF THE INVENTION

This invention relates generally to double carrier bilateral transmission systems and, more particularly, to double carrier bilateral transmission systems employing phase locked loops at each end.

A single carrier frequency modulated bilateral transmission system employing a transceiver at each end comprising a phase locked loop has been set forth in an application by W. B. Gaunt, Jr., Ser. No. 678,398, filed Oct. 26, 1967. The bilateral transmission system disclosed therein may be utilized where the crosstalk problems in the transmission lines are negligible. When significant crosstalk problems exist, the operation of the single carrier bilateral transmission system may be impaired and provision of a double carrier bilateral transmission system will eliminate the crosstalk problem.

The present invention, although not limited to such an application, may be used for telephone transmission. At present, there is an increasing demand for additional telephones in areas in which there is already an overcrowded condition with regard to telephone lines. These telephone lines extend from a central office to individual subscribers served by the central office. When it is unfeasible to install additional lines in these areas, carrier transmission employing pre-existing lines may be employed. Carrier transmission may also be employed in remote areas where telephone lines exist since it may be less expensive to employ carrier transmission than add additional lines. Where carrier transmission is employed, significant crosstalk problems exist for a single carrier bilateral transmission system.

An object of the present invention is to provide a transceiver comprising a phase locked loop which may be employed in a telephone transmission system which effectively eliminates crosstalk problems.

Another object of the present invention is to provide a transceiver comprising a phase locked loop capable of receiving a modulated carrier having one frequency and transmitting a modulated carrier having a different frequency.

Still another object of the present invention is to provide a double carrier bilateral transmission system employing a transceiver at each end comprising a phase locked loop which eliminates crosstalk problems.

Another object of the present invention is to provide a double carrier bilateral transmission system employing a transceiver at each end comprising a phase locked loop.

SUMMARY OF THE INVENTION

In accordance with the invention, the above objects are accomplished by providing a bilateral transmission system employing a transceiver at each end comprising a phase locked loop which transmits and receives modulated carriers having different carrier frequencies. Each phase locked loop includes a phase comparator and a voltage controlled oscillator. The modulated carrier received by each phase locked loop is phase compared with the output of its voltage controlled oscillator. The voltage controlled oscillators provide different carrier frequencies for the signal to be transmitted by the respective phase locked loop. In accordance with one feature of the present invention, means are included in one phase locked loop to convert the frequency of the modulated carrier received by that phase locked loop to a frequency which is equal to the output frequency of the voltage controlled oscillator of that phase locked loop. In accordance with another feature of the present invention, means are included in the other phase locked loop to convert the frequency of the output of its voltage controlled oscillator to be equal to the frequency of the modulated carrier received by that phase locked loop.

The bilateral transmission system including phase locked loops at each end may be employed between a central office and a subscriber. A separate phase locked loop is installed at the central office corresponding to a phase locked loop for each subscriber. Since the distance between the central office and each subscriber may vary, the phase shift suffered by a modulated carrier in the transmission medium will also vary. This variation may be compensated for at the time of installation by auxiliary equipment and complex installation procedures. It would be preferable, though, to provide a telephone receiver which automatically compensates for the phase shift suffered by the modulated carrier in the transmission line where the phase shift will vary with each subscriber.

In a patent application filed by C. F. Kurth, Ser. No. 693,904, filed concurrently with the present application, a bilateral transmission system is set forth which compensates for the phase shift suffered by a modulated carrier in a transmission medium. A phase locked loop has a limited phase variation tracking range due to the limited loop gain of the phase locked loop. Since the phase shift suffered by a modulated carrier in the transmission medium may be significant, the phase locked loop may be incapable of tracking the received modulated carrier. The phase shift problem is not any less significant in a double carrier bilateral transmission system employing phase locked loops at each end. Therefore, the improvement set forth in the patent application filed by C. F. Kurth, Ser. No. 693,904, may be used with the embodiments of the present invention.

Another application, C. F. Kurth, Ser. No. 693,905, filed concurrently with the present application, sets forth a system for comepnsating for significant attenuation suffered by a modulated carrier in the transmission medium. The phase locked loop therein includes a product type phase comparator (operating as a linear comparator) which is sensitive to the amplitude of the modulated carrier received by the phase locked loop. Since the loop gain of the phase locked loop is dependent upon the output of the phase comparator, significant attenuation suffered by the modulated carrier in transmission will cause the loop gain of the phase locked loop to markedly vary. In the related application by C. F. Kurth Ser. No. 693,905, an automatic gain control circuit is set forth for use in a single carrier bilateral transmission system which will compensate for the attenuation suffered by the modulated carrier in the transmission medium and thus, maintain the loop gain of the phase locked loop relatively constant. This automatic gain control circuit may also be used in embodiments of the present inventon since the embodiments also include product type phase comparators (operating as a linear phase comparator) which are sensitive to the amplitude of the modulated carrier received by the phase locked loops.

DETAILED DESCRIPTION

A frequency modulated single carrier bilateral transmission system employing phase locked loops at each end has been described in an application by W. B. Gaunt, Jr., Ser. No. 678,398, filed Oct. 26, 1967. When significant crosstalk problems are encountered through the transmission medium, the operation of the bilateral transmission system may be impaired.

Figure 1:
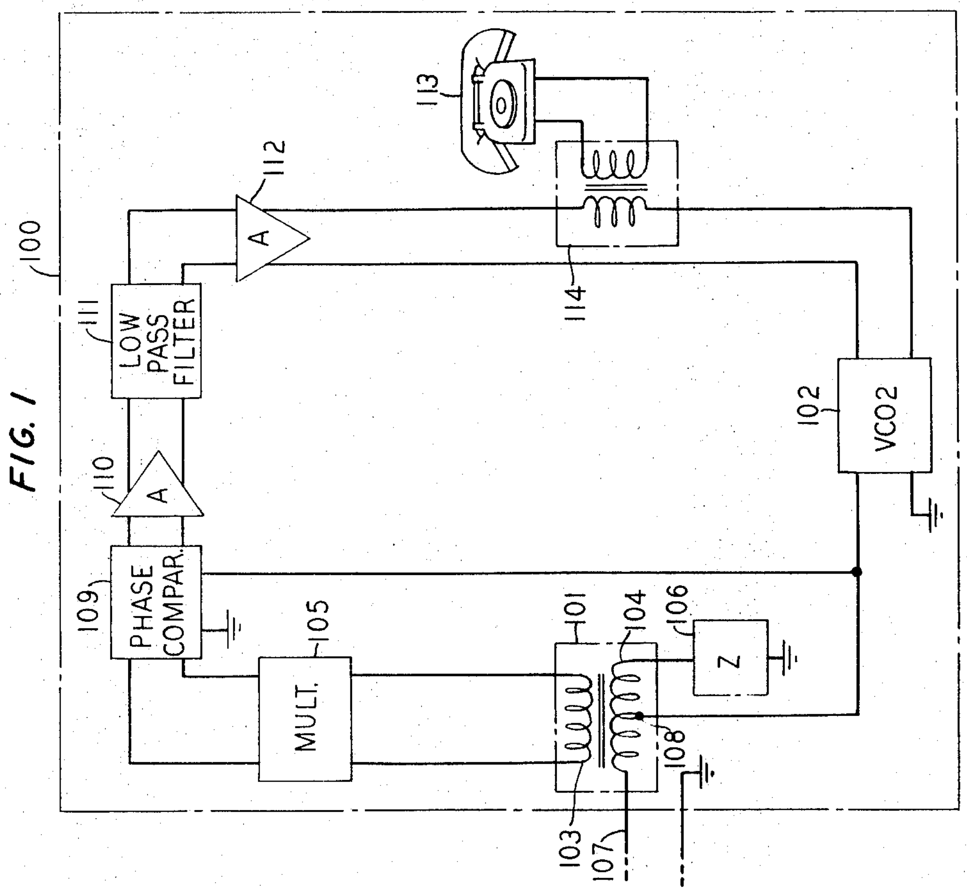
FIG. 1 is a block diagram of a transceiver which, in accordance with the present invention, eliminates crosstalk problems encountered through the transmission medium.

FIG. 1 is a block diagram of a transceiver which, in accordance with the present invention, eliminates the crosstalk problem by permitting the transceiver to transmit at one carrier frequency and receive a modulated carrier having a different carrier frequency. Means are provided in transceiver 100 to separate the transmitted and received modulated carrier. Hybrid 101 which is part of transceiver 100 may serve this separation function while insuring that the modulated carrier output of voltage controlled oscillator 102 is transmitted. A voltage controlled oscillator whose frequency output is linearly proportional to its voltage input may be used in the present invention. An example of a voltage controlled oscillator suitable for use in the present invention may be found on page 67 of "Phaselock Techniques," written by F. M. Gardner and published by John Wiley & Sons, Inc. in 1966. Hybrid 101 consists of primary winding 103 and secondary winding 104. Primary winding 103 is connected to frequency multiplier 105. A fequency multiplier whose output frequency is integrally related to its input frequency may be used in the present invention. An example of a frequency multiplier which may be a frequency doubler, suitable for use in the present invention, may be found on page 4 of "International Series of Monographs on Electronics and Instrumentation," written by L. L. Rozhanskii, translated by Andrew Colin and published by The MacMillan Company in 1963. One end of secondary winding 104 is connected to terminating impedance 106. The other end of secondary winding 106 is connected to transmission line 107. The secondary winding 106 is tapped at point 108, which is connected to voltage controlled oscillator 102. Hybrid 101 insures that the output of the voltage controlled oscillator 102 received at point 108 is transferred to the transmission line 107 and not transferred to primary winding 103. In addition, hybrid 101 insures that the modulated carrier received by transceiver 100 at secondary winding 104 is transferred to the primary winding 103 and not transferred to voltage controlled oscillator 102. Therefore, the hybrid serves to separate the modulated carrier received from that transmitted by transceiver 100.

The modulated carrier received by transceiver 100 is applied to frequency multiplier 105, the output of which is supplied to phase comparator 109. The output of voltage controlled oscillator 102 is an integral multiple of the carrier frequency of the modulated carrier received by transceiver 100. Frequency multiplier 105 converts the frequency of the modulated carrier received by transceiver 100 to more nearly equal to the output frequency of voltage controlled oscillator 102. Phase comparator 109 multiplies the compared signals and produces an output having sum and difference components. The output of phase comparator 105 is passed through the series connection of amplifier 110 and low pass filter 111. A product type phase comparator operating as a linear phase comparator may be utilized in the present invention. An example of a product type phase compartor operating as a linear phase comparator which is suitable for use in the present invention has been described in a patent application, C. F. Kurth, Ser. No. 693,904, filed simultaneously with the present invention. The description of the phase comparator may be found in FIG. 3 therein. The output of low pass filter 111 is applied to amplifier 112, the output of which is supplied to utilization device 113 through transformer 114. For purposes of illustration, utilization device 113 may be a telephone set which is capable of both transmitting and receiving voice signals. In addition, the output of amplifier 112 is supplied, in part, to voltage controlled oscillator 102.

The operation of transceiver 100 may best be understood with reference to FIG. 1. Transceiver 100 includes phase comparator 109, which produces an output proportional to frequency difference between the converted modulated carrier received by transceiver 100 and the output of voltage controlled oscillator 102. If a frequency difference occurs, a voltage will be developed at the output of phase comparator 109 which is fed back to voltage controlled oscillator 102 to adjust the output of voltage controlled oscillator 102 so that it is frequency synchronized with the signal received by transceiver 100.

The output of phase comparator 109 which is fed back to voltage controlled oscillator 102 adjusts the output of voltage controlled oscillator 102 so that its frequency is more equal to the converted carrier frequency of the modulated carrier received by transceiver 100. Transceiver 100 is capable of receiving a modulated carrier having a first carrier frequency and transmitting a modulated carrier having a different carrier frequency where the carrier frequencies are integral multiples of each other. Through this mechanism, a double carrier transceiver is provided which eliminates the crosstalk problems encountered in a single carrier phase locked loop set forth in the prior Gaunt system. The operation of transceiver 100 is similar to that of a standard phase locked loop but the crosstalk problems inherent in a standard phase locked loop which serves as a transceiver have been eliminated.

Phase comparator 109 is a phase multiplier which is operated in its linear range. The phase deviation compared in comparator 109 is small enough so as to maintain phase comparator 109 operating linearly. Therefore phase comparator 109 may be considered to be a linear phase comparator. Consequently, the output of amplifier 112 is proportional to the phase difference between the signals supplied to phase comparator 109. Since the information in the received modulated carrier is carried in the phase of its modulated carrier, amplifier 112 produces a signal which is proportional to the transmitted information. This output is supplied to utilization device 113 through transformer 114. For purposes of illustration, utilization device 113 is shown to be a telephone transmitter and receiver. In addition, a portion of the output of amplifier 112 is supplied to voltage controlled oscillator 102 as a feedback voltage so that the phase of the output produced by voltage controlled oscillator 102 may more nearly equal the phase of the received modulated carrier. The dynamics of a phase locked loop require that the phases compared are never equal since the phase locked loop is a feedback system.

Transceiver 100 serves not only as a receiver but also transmits the signal emanating from utilization device 113. Voltage controlled oscillator 102 produces an output whose frequency is determined, in part, by the amplitude of the wave applied to its input. The output of utilization device 113 is applied to voltage controlled oscillator 102 through transformer 114 which will modulate the output of voltage controlled oscillator 102. The modulated carrier produced by voltage controlled oscillator 102 will be transmitted through transmission line 107 after passing through hybrid 101. Therefore, the modulated carrier transmitted through transmission line 107 will have a carrier frequency which is an integral multiple of the carrier frequency of the modulated carrier received by transceiver 100. Provision of a double carrier transceiver comprising a phase locked loop eliminates the attendant crosstalk problems which may severely impair the operation of a transceiver comprising a standard phase locked loop.

Figure 2:
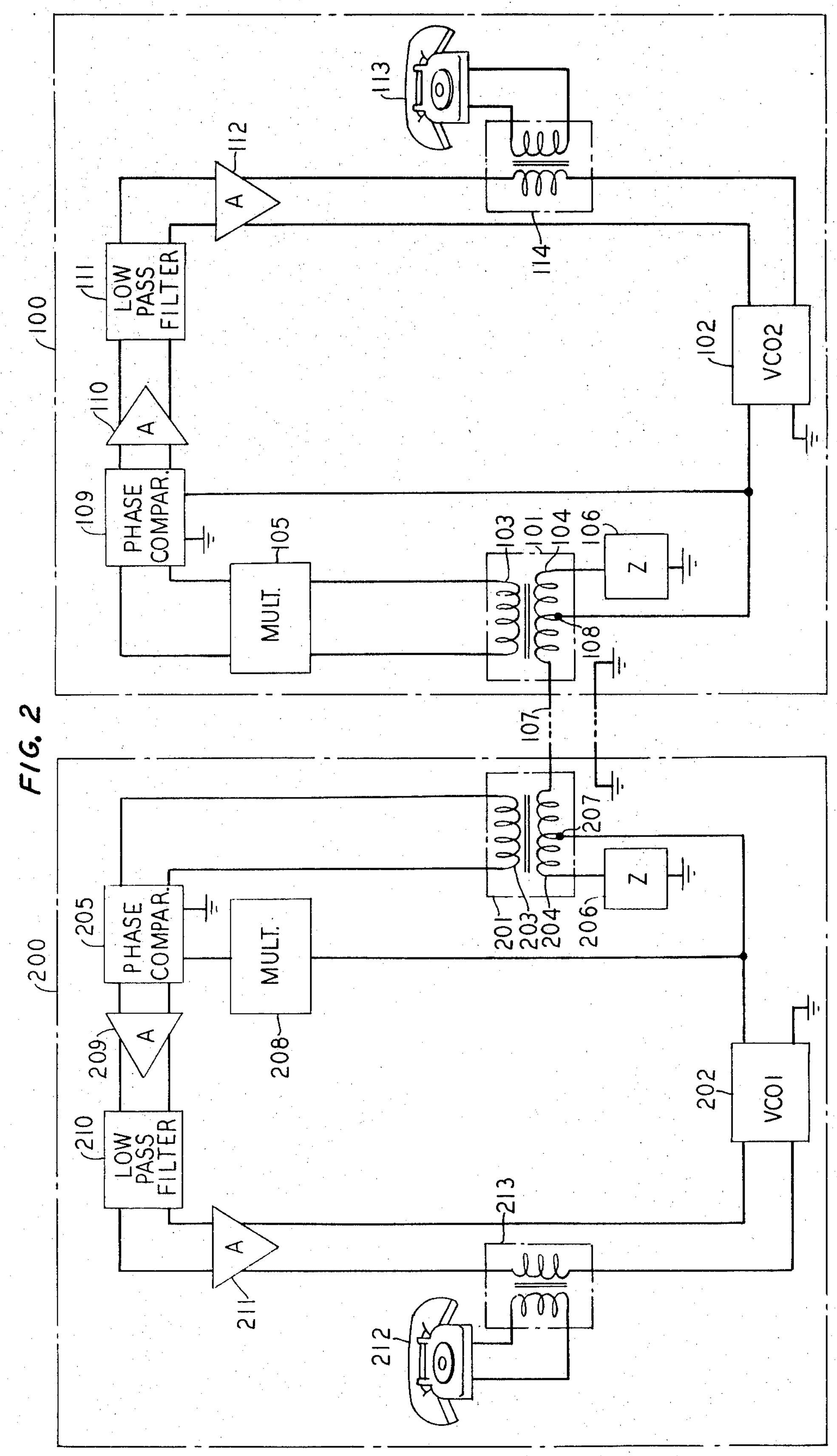
FIG. 2 is a block diagram of a bilateral transmission system employing the transceiver of FIG. 1 at one end and a second transceiver at the other, to be employed, in accordance with the present invention, when significant crosstalk problems are encountered in the transmission medium which connects the two transceivers.

FIG. 2 is a block diagram of a bilateral transmission system utilizing the principles of the present invention so that a bilateral transmission system employing essentially phase locked loops at each end may be employed where significant crosstalk problems are encountered in the transmission medium. The bilateral transmission system comprises transceiver 200, transmission line 107, and transceiver 100. Transceiver 100 has been set forth and fully explained in FIG. 1. Therefore, like numerals are employed in FIG. 2 for transceiver 100 in explaining its operation as part of the bilateral transmission system, which is one embodiment of the present invention.

Both transceiver 200 and tranceiver 100 transmit and receive a modulated carrier using the same apparatus for both operations. Means are provided for transceiver 200, as in transceiver 100, to separate the transmitted and received modulated carrier. Hybrid 201, which is part of transceiver 200, serves this separation function while insuring that the modulated carrier output of voltage controlled oscillator 202 will be transmitted to transceiver 100. The hybrid consists of primary winding 203 and secondary winding 204. Primary winding 203 is connected to phase comparator 205. One end of secondary winding 204 is connected to terminal impedance 206. The other end of secondary winding 204 is connected to transmission line 107. The secondary winding 204 is tapped at point 202. Hybrid 201 provides that the output of voltage controlled oscillator 202 received at tapped point 207 is transferred to transmission line 107 while not being transferred to primary winding 203. In addition, hybrid 201 insures that the signal received by transceiver 200 at secondary winding 204 is transferred to primary winding 203 while not being transferred to voltage controlled oscillator 202. Therefore, the hybrid serves to separate the modulated carrier received from that transmitted by transceiver 200.

The modulated carrier received by transceiver 200 is applied to phase comparator 205, as is the output of voltage controlled oscillator 202 after it has passed, in accordance with one feature of the present invention, through frequency multiplier 208. The carrier frequency of the modulated carrier received by the transceiver is an integral multiple of the frequency output of voltage controlled oscillator 202. The carrier frequency of the modulated carrier received by transceiver 200 is provided by voltage controlled oscillator 102, which is included in transceiver 100. The frequency of the output of voltage controlled oscillator 202 may pass through frequency multiplier 208 in order for it to more nearly equal the carrier frequency of the modulated carrier transmitted by transceiver 100. The output of phase comparator 205 is passed through the series connection of amplifier 209 and low pass filter 210. The output of low pass filter 210 is connected to amplifier 211, the output of which may be supplied to utilization device 212 through transformer 213. For purposes of illustration, utilization device 212 is shown to be a telephone set which is capable of both transmitting and receiving voice signals. In addition, the output of amplifier 211 may, in part, be supplied to the voltage controlled oscillator 202.

The operation of transceiver 200 may best be understood with reference to FIG. 2. Since the carrier frequency of the modulated carrier received by transceiver 200 is in integral multiple of the frequency output of voltage controlled oscillator 202, the output of voltage controlled oscillator 202 is passed through frequency multiplier 208. Provision of frequency multiplier 208 enables transceiver 200 to receive a modulated carrier having a different carrier frequency from the modulated carrier it transmits. This provision eliminates the cross-talk problem encountered in the prior bilateral transmission system employing a transceiver at each end comprising a standard phase locked loop found in the prior Gaunt system. Phase comparator 205 produces an output which is proportional to frequency difference between the modulated carrier received by transceiver 200 and the converted output of voltage controlled oscillator 202. If frequency difference occurs, a voltage will be developed at the output of phase comparator 205 which is fed back to voltage controlled oscillator 202 as a D.C. bias to adjust the output of voltage controlled oscillator 202 so that it is frequency synchronized with the signal received by transceiver 200.

Phase comparator 205 operates the same as phase comparator 109 which was described above with reference to FIG. 1. Phase comparator 205 operates linearly over the range of phase difference variation, and consequently, the output of amplifier 211 is proportional to the phase difference between the signals supplied to phase comparator 205. Since the information in the modulated carrier transmitted by transceiver 100 is carried in the phase of its modulated carrier, amplifier 211 produces a signal which is proportional to the transmitted information. This output is supplied to utilization device 212 through transformer 213. For purposes of illustration, utilization device 212 is shown to be a telephone transmitter and receiver. In addition, a portion of the output of amplifier 211 is supplied to a voltage controlled oscillator 202 as a feedback voltage so that the phase of the output produced by voltage controlled oscillator 202 may more nearly equal the phase of the modulated carrier transmitted by transceiver 100.

Transceiver 200 serves not only as a receiver but also transmits the signal emanating from utilization device 212. Voltage controlled oscillator 202 produces an output whose frequency is determined, in part, by the amplitude of the wave applied to the input of the voltage controlled oscillator. Thus, the output of utilization device 212 is applied to voltage controlled oscillator 202 through transformer 213 which will modulate the output of voltage controlled oscillator 202. The modulated carrier produced by voltage controlled oscillator 202 will be transmitted to transceiver 100 through transmission line 107 after passing through hybrid 201.

The operations of transceiver 100 and phase locked loop 200 have been described above and their use in a bilateral transmission system, such as shown in FIG. 2. A detailed description of transceiver 100 and transceiver 200 is, therefore, unnecessary to be set forth at this point since it would merely be repetitious. Transceivers 100 and 200 are each capable of transmitting and receiving at carrier frequencies which are different from one another. By providing a double carrier bilateral transmission system, the crosstalk problem encountered in the prior Gaunt bilateral transmission system may be eliminated.

While the system shown in FIGS. 1 and 2 utilizes frequency multipliers to provide the desired frequency relationships, frequency dividers could be utilized instead and a combination of frequency multipliers and dividers may provide the desired frequency relationships.

It is to be understood that the embodiments of the invention which have been described are merely illustrative of the application of the principles of the invention. Numerous modifications may readily be devised by those skilled in the art without departing from the spirit and scope of the invention.

What is claimed is:

1. A bilateral transmission system comprising a first transceiver at one end which transmits a modulated signal having a carrier frequency $f_1$ over the interconnecting transmission medium, and a second transceiver at the other end which transmits a modulated signal having a carrier frequency $f_2$ over said transmission medium, each of said first and second transceivers comprising a phase locked loop which includes a phase comparator having its output connected to an oscillator to vary the output phase of the oscillator in accordance with the output signal from the said phase comparator, said oscillator in said first transceiver having the carrier frequency $f_1$ as its frequency of oscillation while said oscillator in said second transceiver has the carrier frequency $f_2$ as its frequency of oscillation, and an individual transmitting and receiving device in each of said transceivers respectively connected with each of said phase comparators and each of said oscillators to modulate the carrier frequency of the oscillator in accordance with the signal to be transmitted and to receive the transmitted information from the other transceiver, said first transceiver comprising means connecting its said oscillator to its said phase comparator and a first frequency converter connecting said transmission medium to said phase comparator to convert the incoming modulated signal having a carrier frequency $f_2$ to a modulated signal having a carrier frequency $f_1$, said second transceiver comprising means connecting the input of its said phase comparator to said transmission medium and a second frequency converter connecting its said oscillator to its said phase comparator to convert the frequency of oscillation $f_1$ output of its said oscillator to the frequency $f_2$ of the carrier from said first transceiver.

2. A bilateral transmission system as set forth in claim 1 wherein the frequency of oscillation $f_1$ of said oscillator in said first transceiver is an integral multiple of the frequency of oscillation $f_2$ of said oscillator in said second transceiver.

References Cited

UNITED STATES PATENTS

| | | | |
|---|---|---|---|
| 3,144,606 | 8/1964 | Adams et al. | 325—14X |
| 3,397,360 | 8/1968 | Kaneko et al. | 325—45 |
| 3,230,453 | 1/1966 | Boor et al. | 325—67 |

RICHARD MURRAY, Primary Examiner

B. V. SAFOUREK, Assistant Examiner

U.S. Cl. X.R.

179—2.5; 325—17, 25, 58, 63; 329—50